United States Patent [19]
Schaaf

[11] 3,879,456
[45] Apr. 22, 1975

[54] PROCESS FOR PREPARING CHLORTETRACYCLINE NEUTRAL BASE

[75] Inventor: Kurt H. Schaaf, Morris Plains, N.J.

[73] Assignee: Diamond Shamrock Corporation, Cleveland, Ohio

[22] Filed: Dec. 17, 1968

[21] Appl. No.: 784,477

[52] U.S. Cl. .......................................... 260/559 AT
[51] Int. Cl. ........................................... C07c 103/19
[58] Field of Search ............................... 260/559 AT

[56] References Cited
UNITED STATES PATENTS

| | | | |
|---|---|---|---|
| 2,671,806 | 3/1954 | Winterbottom et al. | 260/559 |
| 2,734,018 | 2/1956 | Minieri et al. | 260/559 |
| 2,763,682 | 9/1956 | Winterbottom et al. | 260/559 |
| 2,831,878 | 4/1958 | Ensminger et al. | 260/559 |
| 2,929,837 | 3/1960 | Ogawa et al. | 260/559 |
| 3,005,025 | 10/1961 | McCormick et al. | 260/559 |

*Primary Examiner*—Alton D. Rollins
*Assistant Examiner*—AnneMarie T. Tighe
*Attorney, Agent, or Firm*—Neal T. Levin

[57] ABSTRACT

Chlortetracycline neutral base is prepared by slurrying chlortetracycline hydrochloride in water or an aqueous alkanol solution, then adding a water soluble salt of a carboxylic acid having from 2 to 4 carbon atoms to convert the chlortetracycline hydrochloride slurry to a chlortetracycline neutral base slurry and thereafter recovering chlortetracycline neutral base from the neutral base slurry by filtration.

7 Claims, No Drawings

PROCESS FOR PREPARING CHLORTETRACYCLINE NEUTRAL BASE

BACKGROUND OF THE INVENTION

This invention relates to a process for preparing chlortetracycline neutral base and more particularly to an improved process for preparing chlortetracycline neutral base using an aqueous slurry of chlortetracycline hydrochloride containing a water soluble salt of a carboxylic acid having from two to four carbon atoms.

U.S. Pat. No. 3,671,806 — Winterbottom et al., Mar. 9, 1954 describes a process of purifying chlortetracycline which involves dissolving crude chlortetracycline is a hydroxylated organic compound, e.g., lower alkanol or lower alkoxy lower alkanol by the use of a nitrogenous base, i.e., triethylamine, which serves to neutralize and solubilize the chlortetracycline. Undissolved impurities are removed from the solution by filtration; purified chlortetracycline hydrochloride is precipitated from the filtrate by readjusting the pH of the filtrate with hydrochloric acid and the purified chlortetracycline hydrochloride is recovered by filtration. This patent also suggests that chlortetracycline hydrochloride be converted to chlortetracycline neutral base by dissolving crude chlortetracycline hydrochloride in a lower alkanol or a lower alkoxy lower alkanol by addition of a suitable amine, removing insoluble impurities by filtration and then adding water to precipitate chlortetracycline neutral base.

U.S. Pat. No. 3,005,025 — McCormick et al. — Oct. 17, 1961, indicates that the Winterbottom et al. process produces a high quality therapeutically useful product but has certain disadvantages, e.g., it involves use of hydroxylated organic compounds and organic bases which keep the cost of the purification procedure high. A further disadvantage is that the yield and potency of chlortetracycline neutral base are not as high as desired. The McCormick et al patent discloses a procedure wherein chlortetracycline hydrochloride is converted to chlortetracycline neutral base by slurrying the hydrochloride in a lower alkoxy lower alkanol, e.g., 2-methoxyethanol or 2-ethoxyethanol, and water containing an alkali metal carbonate, e.g., sodium carbonate, so as to adjust the pH of the solution to between 3.5 and 7.0 whereupon purified crystalline chlortetracycline neutral base is obtained. Although the McCormick et al. procedure produces chlortetracycline neutral base in high yields and in high potencies, it employs the high cost lower alkoxy lower alkanols of the Winterbottom et al. procedure. Further, the chlortetracycline moiety is exposed to localized strongly alkaline conditions when the alkali metal carbonate is added to the chlortetracycline hydrochloride solution. Such localized strongly alkaline conditions can easily destroy part of the chlortetracycline moiety and are difficult to avoid them when alkali metal carbonate solutions are added to chlortetracycline hydrochloride solutions.

It is an object of the present invention to provide a process for preparing chlortetracycline neutral base. Another object is to provide a process which produces high yields and high potencies of chlortetracycline neutral base. A further object is to provide a chlortetracycline neutral base process wherein localized strongly alkaline conditions are avoided. Still another object is to provide a chlortetracycline neutral base process wherein inexpensive, easily recoverable solvents are used. Other objects of this invention will become apparent from the detailed description given herein. However, it is intended that the detailed description and specific examples do not limit this invention, but merely indicate preferred embodiments.

SUMMARY OF THE INVENTION

The objects of this invention are accomplished in the following manner. Chlortetracycline neutral base is prepared in high yields and in high potencies by (a) bringing together chlortetracycline hydrochloride, and at least one mole of a water soluble salt of a carboxylic acid having from two to four carbon atoms per mole of said chlortetracycline hydrochloride in the presence of a solvent such as water or an aqueous alkanol solution containing from about 1 to about 75% by weight of an alkanol having from about 1 to about 5 carbon atoms and from about 99% to about 25% by weight of water thereby forming a slurry, (b) stirring said slurry to convert said chlortetracycline hydrochloride to chlortetracycline neutral base, and thereafter (c) recovering chlortetracycline neutral base from said slurry. If desired, the chlortetracycline hydrochloride and solvent can be first brought together and thereafter the water soluble salt of the carboxylic acid can be introduced to convert the chlortetracycline hydrochloride to chlortetracycline neutral base.

DESCRIPTION OF THE PREFERRED EMBODIMENTS

This process is carried out by slurrying about 1 part by weight of chlortetracycline hydrochloride in from about 2 parts to about 10 parts by weight of water or aqueous alkanol solution. Useful aqueous alkanol solutions include solutions of alkanols containing from about 1% to about 75% by weight of an alkanol having from about 1 to about 5 carbon atoms and from about 99% to about 25% by weight of water. Useful alkanols include methanol, ethanol, n-propanol, isopropanol, n-butanol, t-butanol, other water soluble alcohols and the like.

The process of the present invention has numerous advantages over the prior art processes described above. Large quantities of costly solvents and nitrogenous bases are not required as chlortetracycline is processed in the form of a heterogeneous slurry rather than in the form of a homogeneous solution. Thus, the process does not involve recrystallization from solution or recovery of large quantities of solvents and nitrogenous bases. Further, the process of this invention has the advantage over processes using alkali carbonates in that highly alkaline conditions are avoided. It is well known that aqueous solutions of alkali carbonates have alkalinities that approximate those of alkali hydroxides and that such highly alkaline materials attack the chlortetracycline moiety.

Chlortetracycline hydrochloride is slurried in water or an aqueous alcohol solution at a temperature of from about 0° to about 100°C with preferred temperatures being from about 15° to about 30°C. If desired, the succeeding process steps can be carried out at these temperatures. Other than in drying steps, temperatures at or below the boiling point of water or the aqueous alkanol solution are employed.

After the chlortetracycline hydrochloride slurry has been stirred about 0.25 to about 24 hours at the above-mentioned temperatures, from about 1.0 to about 1.6 mole of a water soluble salt of a carboxylic acid having from 2 to 4 carbon atoms per mole of chlortetracycline hydrochloride present in the slurry is added with stirring to the slurry and the slurry stirred for about 1 to about 24 hours at about 0° to about 100°C, to convert the chlortetracycline hydrochloride slurry to a chlortetracycline neutral base slurry. Useful water soluble salts of the above carboxylic acids include sodium acetate, lithium acetate, potassium acetate, ammonium acetate, magnesium acetate, calcium acetate, zinc acetate, ferrous acetate, cupric acetate, or the like, the corresponding propionates, isobutyrates and butyrates such as sodium propionate, potassium propionate, sodium isobutyrate, potassium butyrate, lithium butyrate and the like.

The water soluble salt of a carboxylic acid having from two to four carbon atoms reacts with chlortetracycline hydrochloride to liberate chlortetracycline neutral base and to form the carboxylic acid and the chloride salt of the cation present in the water soluble salt added to the slurry. When an excess of the water soluble salt is used, the excess does not react but instead forms a buffer solution with the free carboxylic acid produced by the reaction. This buffer solution controls the pH of the reaction mixture at a pH of from about 3.5 to about 7 as compared to a pH of from about 3 to about 5 when only equimolar quantities of chlortetracycline hydrochloride and water soluble salt are used. The process of this invention has the advantage that the chlortetracycline moiety is not exposed to localized strongly alkaline conditions at any time during processing.

Chlortetracycline neutral base can be recovered by filtering the slurry. The resulting chlortetracycline neutral base filter cake can then be washed with water, an aqueous alkanol solution, or an organic solvent to remove impurities and dried. If desired, the filter cake can be reslurried in water, an aqueous alkanol solution or an organic solvent, recovered by filtration, and then dried. Any of the above-mentioned aqueous alkanol solutions can be used for washing and/or reslurrying the chlortetracycline neutral base filter cake. Organic solvents such as acetone, methyl ethyl ketone, methanol, ethanol, isopropanol, butanol, diethyl ether, their mixtures and the like can be used, for washing and/or reslurrying of the filter cake. After the chlortetracycline neutral base filter cake has been recovered and washed, the wet filter cake is dried to remove water, aqueous alkanol solution, organic solvents and other volatile materials. The wet filter cake can be dried at a temperature of from about 0° to about 110°C. A convenient method of drying is vacuum drying at about 15° to about 30°C for from about 12 to about 48 hours. It is to be understood that drying conditions are selected so that decomposition and/or destruction of chlortetracycline neutral base does not occur.

Assays for tetracycline type antibiotics are ordinarily reported as $\gamma$(micrograms) activity per milligram of product. Assays for chlortetracycline neutral base and its salts can be reported in terms of chlortetracycline neutral base or chlortetracycline hydrochloride. Because of the difference in molecular weights between chlortetracycline neutral base and chlortetracycline hydrochloride, a pure sample of chlortetracycline neutral base would assay 1075 $\gamma$mg as chlortetracycline hydrochloride.

Conversion of chlortetracycline hydrochloride to chlortetracycline neutral base results in reduction of the molecular weight from 515.36 to 478.88, a decrease of about 7.2% in weight. Efficiency of conversion of hydrochloride to neutral base should not be based on weight loss alone as the resulting neutral base could contain impurities such as solvents, neutralization products or the like which might interfere with its use. One such problem that could arise is in the preparation of the chlortetracycline bisulfate, a reaction which can be used as an additional criterion for determing the quality of the base. Chlortetracycline bisulfate can be prepared by the procedure given in copending Serial No. 708,815 — Greenbaum, and Loter filed Feb. 28, 1968. If the neutral base produces a bisulfate, which dissolves in water to form a solution of high clarity, the quality of the neutral base is satisfactory. It has been found that if the neutral base contains a low quantity of ionizable chloride such as in the case of the products of Expt. A, B or D of Example IX (see Table I), the neutral base will form a bisulfate which dissolves in water to produce a solution of high clarity and is of satisfactory quality. The % by weight of ionizable chloride can be determined by various means. For example, % by weight ionizable chloride can be determined by potentiometric titration using silver and glass electrodes to determine the endpoint.

For a fuller understanding of the nature and objects of this invention, reference may be made to the following examples. These examples are given merely to illustrate the invention and are not to be construed in a limiting sense. All parts, proportions and quantities are by weight unless otherwise indicated. The terms (v/v), $\gamma$, mg, g, ml and °C are used to indicate volume/volume, micrograms (gammas), milligrams, grams, milliliters and degrees Centigrade respectively in these examples.

EXAMPLE I

To 5,000 ml of 50% (v/v) aqueous methanol solution, a solution containing 43% by weight of methanol and 57% by weight of water, was added with stirring 1,300g of chlortetracycline hydrochloride assaying 962 $\gamma$mg thereby obtaining a slurry of chlortetracycline hydrochloride. After the slurry had been stirred for about 0.25 hours, 236.5g of anhydrous sodium acetate was added using 1,000 ml of 50% (v/v) aqueous methanol solution to aid in the sodium acetate addition. This slurry was then stirred at room temperature for about 4 hours to convert the chlortetracycline hydrochloride to chlortetracycline neutral base. The neutral base was collected by filtration. Then the resulting neutral base filter cake was slurried at room temperature for about 0.5 hour and refiltered with suction using two 1,200 ml portions of 50% (v/v) aqueous methanol solution and a 1,200 ml portion of acetone to wash the filter cake. The filter cake was vacuum dried at about 23°C affording 1,194.5g of chlortetracycline neutral base assaying 1,000 $\gamma$/mg as chlortetracycline hydrochloride. Pure chlortetracycline neutral base assays 1.075$\gamma$/mg as chlortetracycline hydrochloride. This yield of chlortetracycline neutral base represented 93.2% of theory. The neutral base produced chlortetracycline bisulfate which showed excellent clarity when dissolved in water.

EXAMPLE II

This preparation was carried out in the same manner as in Example I, except that 392.0g of sodium acetate trihydrate was used instead of 236.5g anhydrous sodium acetate. The reslurried, acetone washed, chlortetracycline neutral base was dried in a vacuum oven at about 23°C.

There was obtained 1,165g of chlortetracycline neutral base assaying 1,020 $\gamma$mg as chlortetracycline hydrochloride and corresponding to a yield of 95.3% of theory. The neutral base produced chlortetracycline bisulfate which had excellent clarity when dissolved in water.

EXAMPLE III

A mixture of 21.65g (0.04 mole) of 95.5% pure chlortetracycline hydrochloride assaying 955 $\gamma$/mg and 3.94g (0.048 mole) of anhydrous sodium acetate was covered with 100 ml of distilled water and stirred at room temperature for 4 hours, during the course of which the slurry of chlortetracycline hydrochloride was converted to a slurry of chlortetracycline neutral base. The resulting chlortetracycline neutral base slurry had a yellow, creamy consistency. Filtration of the slurry after reaction proceeded very slowly, requiring several hours for completion.

The chlortetracycline neutral base filter cake was washed with two 20 ml portions of water, then with one 20 ml portion of acetone, and then dried in a vacuum oven at about 23°C to obtain 20.1g of chlortetracycline neutral base assaying 988 $\gamma$/mg as chlortetracycline hydrochloride representing a yield of 96.6% of theory. The neutral base produced chlortetracycline bisulfate which had excellent clarity when dissolved in water.

EXAMPLE IV

A mixture of 21.65g (0.04 mole) of 95.5% pure chlortetracycline hydrochloride and 3.94g (0.048 mole) of anhydrous sodium acetate was slurried in 100 ml of 50% (v/v) aqueous methanol solution and the resulting slurry was stirred at about 23°C for about 4 hours to convert chlortetracycline hydrochloride to chlortetracycline neutral base. The resulting chlortetracycline neutral base slurry was filtered with suction. Filtration of the slurry proceeded rapidly and was completed within a short time.

The chlortetracycline neutral base filter cake was washed with two 20 ml portions of 50% (v/v) aqueous methanol solution, then with one 20 ml portion of acetone, and dried in a vacuum oven at about 23°C to obtain 19.00g of chlortetracycline neutral base assaying 992 $\gamma$/mg as chlortetracycline hydrochloride representing a yield of 91.6% of theory. Chlortetracycline bisulfate, which had excellent clarity when dissolved in water, was produced from the neutral base.

EXAMPLE V

A mixture of 24.30g (0.045 mole) of chlortetracycline hydrochloride assaying 955 $\gamma$/mg and 4.26g (0.052 mole) of anhydrous sodium acetate was slurried in 73 ml of 50% (v/v) aqueous methanol solution and the resulting slurry stirred at about 23°C for about 6 hours to convert the chlortetracycline hydrochloride to chlortetracycline neutral base.

The resulting slurry of chlortetracycline neutral base was filtered with suction. The chlortetracycline neutral base filter cake was washed with two 20 ml portions of 50% (v/v) aqueous methanol solution and then dried in a vacuum oven at about 23°C to obtain 21.1g of chlortetracycline neutral base assaying 1,020 $\gamma$/mg purity as chlortetracycline hydrochloride representing a yield of 93.1% of theory. Chlortetracycline bisulfate, which had excellent clarity when dissolved in water, was produced from the neutral base.

EXAMPLE VI 21.45g (0.04 mole) of chlortetracycline hydrochloride having a purity of 96.2% and 100 ml of 50% (v/v) aqueous methanol solution were charged into a flask equipped with a stirrer and electrodes for pH measurements. The mixture was stirred for 5 minutes to obtain a slurry having a pH of 2.69. Then 5.44g (0.04 mole) of sodium acetate trihydrate was added and agitation continued. After 10 minutes of agitation, the pH of the slurry was 4.74 and decreased gradually until the pH was 3.99 after about 1.5 hours of agitation. Stirring for an additional 45 minutes did not produce any further changes in pH showing that conversion of chlortetracycline hydrochloride to chlortetracyclene neutral base in the slurry was substantially complete.

After the slurry had been stored at 5°C over the weekend, the chlortetracycline neutral base was collected as a filter cake on a Buchner funnel, washed on the filter with two 20 ml portions each of 50% (v/v) aqueous methanol solution, a 20 ml portion of acetone, and then dried in a vacuum oven overnight at about 23°C.

This procedure gave 18.17g of chlortetracycline neutral base in the form of a yellow solid assaying 95.5% chlortetracycline neutral base representing a 90.8% yield. Analysis of the neutral base showed that it contained 0.13% by weight of ionizable chloride ion. Chlortetracycline bisulfate which had excellent clarity when dissolved in water, was produced from the neutral base.

EXAMPLE VII

This example was carried out using the procedure of Example VI with the exception, that a 30% by weight excess of sodium acetate trihydrate was employed.

A mixture of 21.45g (0.04 mole) of chlortetracycline hydrochloride having a purity of 96.2% and 100 ml of 50% (v/v) aqueous methanol solution was stirred for 15 minutes to obtain a slurry having a pH of 2.78. The pH did not change after 5 minutes of agitation. 7.08g (0.052 mole) of reagentgrade sodium acetate trihydrate was then added to the slurry and agitation continued. After 10 minutes of agitation, the pH of the slurry was 4.74 and gradually decreased to 4.69 after 1 hour of agitation. Stirring for an additional 3 hours did not produce any further changes in pH showing that conversion of chlortetracycline hydrochloride to chlortetracycline neutral base in the slurry was substantially complete.

The chlortetracycline neutral base was collected as a filter cake on a Buchner funnel, washed and dried to obtain 18.70g of chlortetracycline neutral base assaying 94.5% chlortetracycline neutral base which corresponded to a 92.5% yield of neutral base. Analysis of the neutral base showed it contained 0.16% by weight ionizable chloride. The neutral base produced a chlortetracycline bisulfate which had excellent clarity when dissolved in water.

EXAMPLE VIII

A. 11.54g chlortetracycline bisulfate was dissolved in 100 ml of distilled water to obtain an approximately 10% by weight solution and the solution was treated with 0.60 ml of 11.40% (g/ml) aqueous hydrochloric acid to obtain a chlortetracycline bisulfate solution, wherein the bisulfate contained 0.81% by weight ionizable chloride. The bisulfate solution remained clear, and chlortetracycline hydrochloride did not precipitate from the solution after 4 days storage at room temperature. Further, no precipitate formed after subsequent storage of the solution at 5°C for 1 day and after subsequent seeding the solution with chlortetracycline hydrochloride crystals and stirring the seeded solution for 1 day at room temperature.

B. 11.54g chlortetracycline bisulfate was dissolved in 100 ml of distilled water to obtain an approximately 10% by weight solution and the solution was treated with 1.20 ml of 11.40% (g/ml) aqueous hydrochloric acid to obtain a chlortetracycline bisulfate solution, wherein the bisulfate contained 1.61% by weight ionizable chloride. The resulting solution, after stirring at room temperature overnight, formed a precipitate which was removed by filtration, washed, and dried to obtain 0.41g of chlortetracycline hydrochloride. Experiments (A) and (B) show that under the above conditions, a chlortetracycline bisulfate solution containing 1.61% by weight ionizable chloride does not produce a satisfactory bisulfate solution whereas a bisulfate solution containing 0.81% by weight ionizable chloride produces a satisfactory bisulfate solution. It follows, that the chlortetracycline neutral base should contain less than 1.61% by weight ionizable chloride.

EXAMPLE IX

This example demonstrates the use of three water soluble carboxylic acid salts within the scope of the present invention, that is, potassium acetate, ammonium acetate, and sodium propionate, and sodium formate, a water soluble carboxylic acid salt outside the scope of this invention.

The water soluble salts were evaluated using in each case 21.45g (0.04 mole) of chlortetracycline hydrochloride having a purity of 96.2%, 100 ml of 50% (v/v) aqueous methanol solution and a 20% excess (0.048 mole) of the above-mentioned water soluble carboxylic acid salts. Results obtained with these salts are shown in Table I. These results show that chlortetracycline neutral base, obtained with potassium acetate, contained 0.13% by weight ionizable chloride; neutral base obtained with ammonium acetate, contained 0.14% by weight ionizable chloride; neutral base obtained with sodium formate, contained 2.50% by weight ionizable chloride; and neutral base, obtained with sodium propionate, contained 0.14% by weight ionizable chloride. Potassium acetate, ammonium acetate and sodium propionate produce neutral base containing less than 0.81% by weight of ionizable chloride which is satisfactory for use in chlortetracycline bisulfate production whereas sodium formate produces chlortetracycline neutral base containing more than 1.61% by weight of ionizable chloride which is unsatisfactory for use in chlortetracycline bisulfate production. The % by weight ionizable chloride was determined by potentiometric titration, using glass and silver electrodes, based on the method given in Analytical Chemistry 31, 1901 (1959).

Expt. A employed potassium acetate U.S.P.; Expt. B reagent-grade ammonium acetate (97% minimum purity); Expt. C sodium formate reagent-grade and Expt. D sodium propionate (Pfizer-Mycoban). In Expts. A and B, the reaction mixtures were stirred for 4.5 hours and then stored at 5°C overnight prior to isolating chlortetracycline neutral base. In Expts. C and D, the reaction mixtures were stirred for 4 hours and chlortetracycline neutral base isolated without additional storage at 5°C.

TABLE I

| | Water soluble carboxylic acid salt | | | Chlortetracycline neutral base | | |
|---|---|---|---|---|---|---|
| Expt. | Chemical Formula | g | mole | Yield g of neutral base | Yield neutral base % theory | % by weight ionizable chloride present in neutral base |
| A | potassium acetate | 4.71 | 0.048 | 18.65 | 92.3 | 0.13 |
| B | ammonium acetate | 3.82 | 0.048 | 18.85 | 94.3 | 0.14 |
| C | sodium formate | 3.26 | 0.048 | 17.63 | 87.3 | 2.50 |
| D | sodium propionate | 4.61 | 0.048 | 18.26 | 90.3 | 0.14 |

What is claimed is:

1. In a process for preparing chlortetracycline neutral base, the steps consisting essentially of
   a. bringing together chlortetracycline hydrochloride, and about 1.0 to about 1.6 mole of a water soluble salt of a carboxylic acid having from 2 to 4 carbon atoms selected from the group consisting of at least one of the acetate, propionate, butyrate or isobutyrate salts of sodium, lithium, potassium, ammonium, magnesium, calcium, zinc, iron (ferrous), or copper (cupric), per mole of said chlortetracycline hydrochloride in the presence of a solvent selected from the group consisting of water and an aqueous alkanol solution containing from about 1 to about 75% by weight of an alkanol having from about 1 to about 5 carbon atoms and about 99 to about 25% by weight of water thereby forming a slurry,
   b. stirring said slurry to convert said chlortetracycline hydrochloride to chlortetracycline neutral base, and thereafter
   c. recovering chlortetracycline neutral base from said slurry.

2. The process of claim 1 wherein said chlortetracycline hydrochloride and said solvent are first brought together and thereafter said water soluble salt is introduced.

3. The process of claim 1 wherein about one part by weight of chlortetracycline hydrochloride in from about 2 to about 10 parts by weight of said solvent is used.

4. The process of claim 1 wherein the steps of said process are carried out at a temperature from about 0° to about 100°C.

5. The process of claim 1 wherein said water soluble salt is sodium acetate.

6. The process of claim 1 wherein said solvent contains about 43% by weight of methanol and about 57% by weight of water.

7. The process of claim 1 wherein from about 1 to about 1.6 mole of a water soluble salt per mole of chlortetracycline hydrochloride is used.

* * * * *

UNITED STATES PATENT AND TRADEMARK OFFICE
CERTIFICATE OF CORRECTION

PATENT NO. : 3,879,456
DATED : April 22, 1975
INVENTOR(S) : Kurt H. Schaaf

It is certified that error appears in the above-identified patent and that said Letters Patent are hereby corrected as shown below:

Column 1, line 12, "U.S. Pat. No. 3,671,806" should be --U.S. Pat. No. 2,671,806--.

Signed and Sealed this

Twenty-ninth Day of August 1978

[SEAL]

Attest:

RUTH C. MASON
Attesting Officer

DONALD W. BANNER
Commissioner of Patents and Trademarks